(12) United States Patent
Lybarger et al.

(10) Patent No.: US 9,169,939 B2
(45) Date of Patent: Oct. 27, 2015

(54) PRESSURE CONTROL SYSTEM FOR RELIEF AND SHUTDOWN OF FLOW

(71) Applicants: Mike Lybarger, Broken Arrow, OK (US); Jud Smalley, Claremore, OK (US)

(72) Inventors: Mike Lybarger, Broken Arrow, OK (US); Jud Smalley, Claremore, OK (US)

( * ) Notice: Subject to any disclaimer, the term of this patent is extended or adjusted under 35 U.S.C. 154(b) by 383 days.

(21) Appl. No.: 13/769,559

(22) Filed: Feb. 18, 2013

(65) Prior Publication Data

US 2013/0213496 A1    Aug. 22, 2013

Related U.S. Application Data

(60) Provisional application No. 61/599,799, filed on Feb. 16, 2012.

(51) Int. Cl.
*F16K 31/12* (2006.01)
*F16K 17/00* (2006.01)
*G05D 16/18* (2006.01)

(52) U.S. Cl.
CPC ............... *F16K 17/00* (2013.01); *G05D 16/18* (2013.01); *Y10T 137/7758* (2015.04)

(58) Field of Classification Search
CPC ........ F16K 17/00; G05D 16/18; G05D 16/16; Y10T 137/7758; Y10T 137/0379; Y10T 137/0396; Y10T 137/2605; Y10T 137/2625; Y10T 137/2635; Y10T 137/7762; Y10T 137/7764
USPC ................ 137/485, 488, 489, 12, 14, 561 R, 137/115.13, 116.3, 115.19, 115.23
See application file for complete search history.

(56) References Cited

U.S. PATENT DOCUMENTS

| | | | | | |
|---|---|---|---|---|---|
| 2,611,218 | A | * | 9/1952 | Spence | 137/485 |
| 3,047,010 | A | * | 7/1962 | Rothfuss | 137/489 |
| 3,227,171 | A | * | 1/1966 | Woelfel | 137/87.04 |
| 3,856,486 | A | * | 12/1974 | Chang | 96/397 |
| 4,083,375 | A | * | 4/1978 | Johnson | 137/86 |
| 4,294,107 | A | * | 10/1981 | Walle | 73/49.2 |
| 4,346,732 | A | * | 8/1982 | Moos | 137/489 |
| 4,617,958 | A | * | 10/1986 | Seidel et al. | 137/492.5 |
| 4,875,502 | A | * | 10/1989 | Romano | 137/627.5 |
| 4,961,441 | A | * | 10/1990 | Salter | 137/14 |
| 5,047,965 | A | * | 9/1991 | Zlokovitz | 700/282 |
| 5,186,393 | A | * | 2/1993 | Yie | 239/583 |
| 5,230,362 | A | * | 7/1993 | Goodman | 137/489 |
| 6,006,780 | A | * | 12/1999 | Tseng et al. | 137/488 |
| 6,095,184 | A | * | 8/2000 | Neff et al. | 137/488 |
| 6,584,999 | B2 | * | 7/2003 | Inayama et al. | 137/487.5 |
| 7,284,563 | B2 | * | 10/2007 | Partridge et al. | 137/14 |
| 7,766,030 | B2 | * | 8/2010 | Askew | 137/85 |
| 7,779,863 | B2 | * | 8/2010 | Jacobsen et al. | 137/596.15 |
| 8,047,226 | B2 | * | 11/2011 | Kesner et al. | 137/489 |
| 2007/0095401 | A1 | * | 5/2007 | Webster | 137/488 |
| 2008/0196773 | A1 | * | 8/2008 | Franconi | 137/492.5 |
| 2013/0092259 | A1 | * | 4/2013 | Griffin et al. | 137/487.5 |

\* cited by examiner

*Primary Examiner* — Craig Schneider
*Assistant Examiner* — Minh Le
(74) *Attorney, Agent, or Firm* — Hall Estill Law Firm

(57) ABSTRACT

This disclosure is related to a non-electronic pressure control system for a pressurized system that receives fluid from a fluid supply. The pressure control system includes a control module, an actuator and a flow control device. The control module monitors the pressure of fluid either upstream or downstream of the flow control device. The control module can send a pneumatic signal to the actuator to open or close the flow control device responsive to the pressure monitored by the control module and the pressure required for the pressurized system.

20 Claims, 7 Drawing Sheets

PRESSURE CONTROL SYSTEM FOR RELIEF AND SHUTDOWN OF FLOW

CROSS-REFERENCE TO RELATED APPLICATIONS

The present application is a conversion of U.S. Provisional Application having U.S. Ser. No. 61/599,799, filed Feb. 16, 2012, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

FIELD OF THE DISCLOSURE

The present disclosure provides a pressure control system that senses desired operating pressures and can automatically actuate a flow control device, such as a valve, to protect the system from over pressure situations.

BACKGROUND OF THE DISCLOSURE

Current methods of pressure relief use conventional relief valves, buckling pins, and rupture discs for pressure safety relief. Such relief devices are mainly based on material failure devices to relieve pressure, but are limited in functionality due to the unsatisfactory flow characteristics (as in the case of the conventional spring relief device) of the devices and the difficulty in prediction of material failure from lot to lot of material (buckling pin, rupture discs). Typically, these devices must be oversized for a given flow rate due to the flow characteristics of the internal flow passages.

Accordingly, there is need for a pressure control system that can sense operating pressures and can automatically open and close a flow control device to prevent over pressure situations.

SUMMARY OF THE DISCLOSURE

The present disclosure is directed to a pressure control system for monitoring fluid pressure for a pressurized system. The pressure control system includes a fluid control device for affecting the pressure of fluid downstream from the fluid control device. The pressure control system also includes an actuator for opening and closing the fluid control device. The pressure control system also includes a control module for processing pneumatic signals from at least one predetermined pressure point upstream or downstream from the fluid control device, the control module sending signals to the actuator to open or close the fluid control device responsive to pneumatic signals. The control module includes a pressure sensor to determine pressures of the fluid from the at least one predetermined pressure point. The control module also includes an air switch to receive pneumatic signals from the pressure sensor responsive to the pressure of the fluid from the at least one predetermined pressure point. The pressure control system further includes a charge valve to send a pneumatic signal to the actuator or exhaust fluid from the control module responsive to a pneumatic signal received from the air switch. This system can be locally reset or resettable from a remote location.

DETAILED DESCRIPTION OF THE DISCLOSURE

Figure 1:
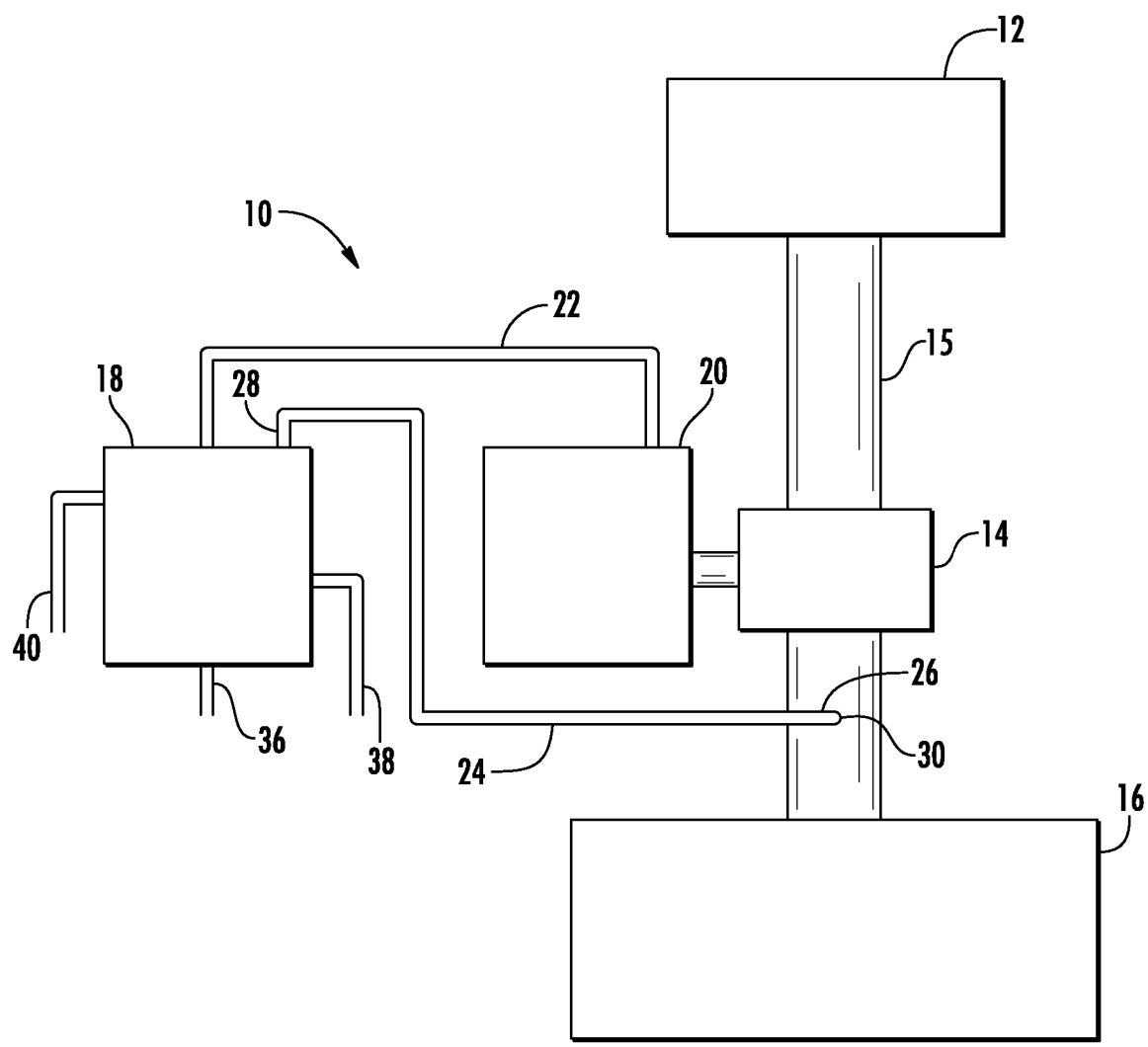
FIG. 1 is a schematic view of a pressure control system constructed in accordance with the present disclosure.
Figure 2:
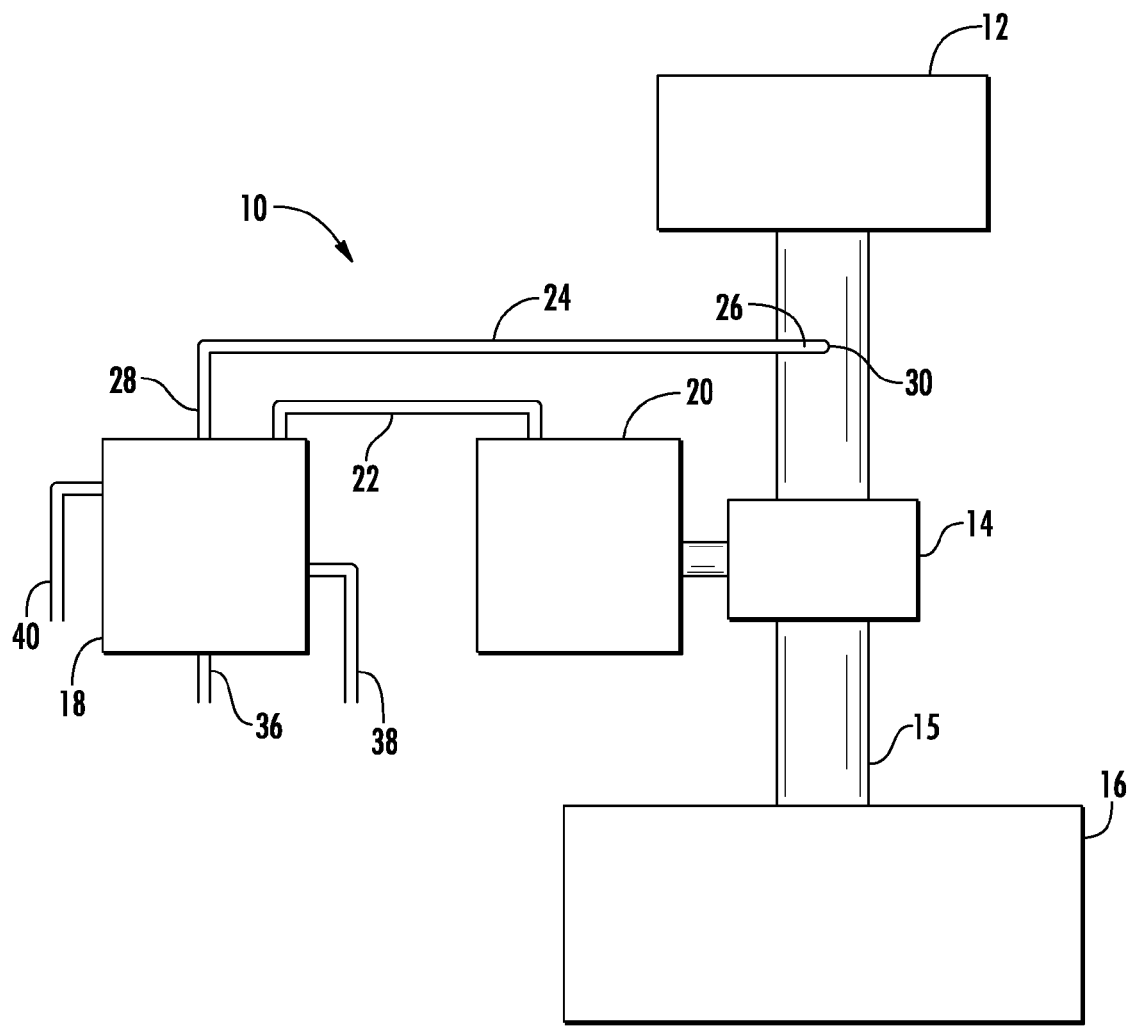
FIG. 2 is a schematic view of another embodiment of the pressure control system constructed in accordance with the present disclosure.
Figure 3:
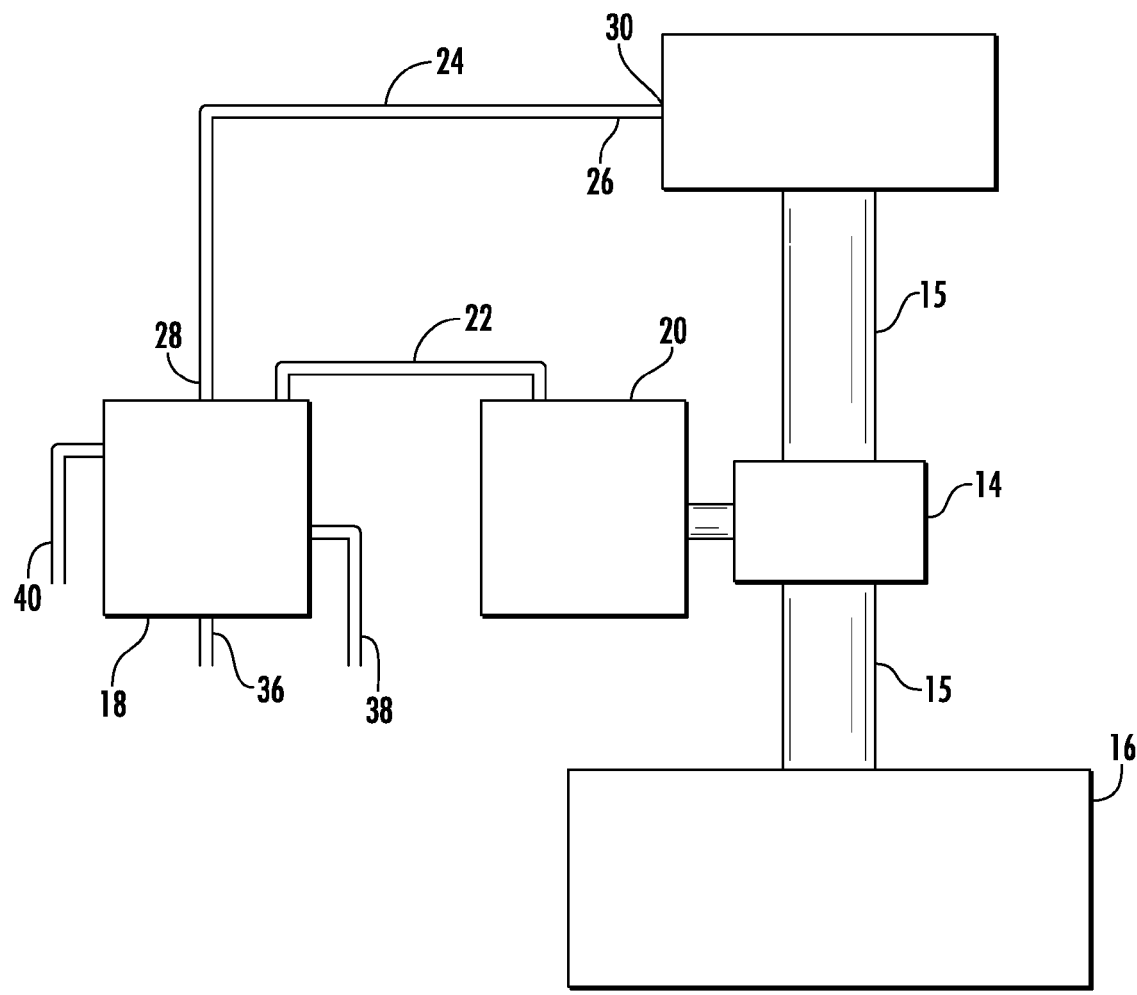
FIG. 3 is a schematic view of another embodiment of the pressure control system constructed in accordance with the present disclosure.
Figure 4:
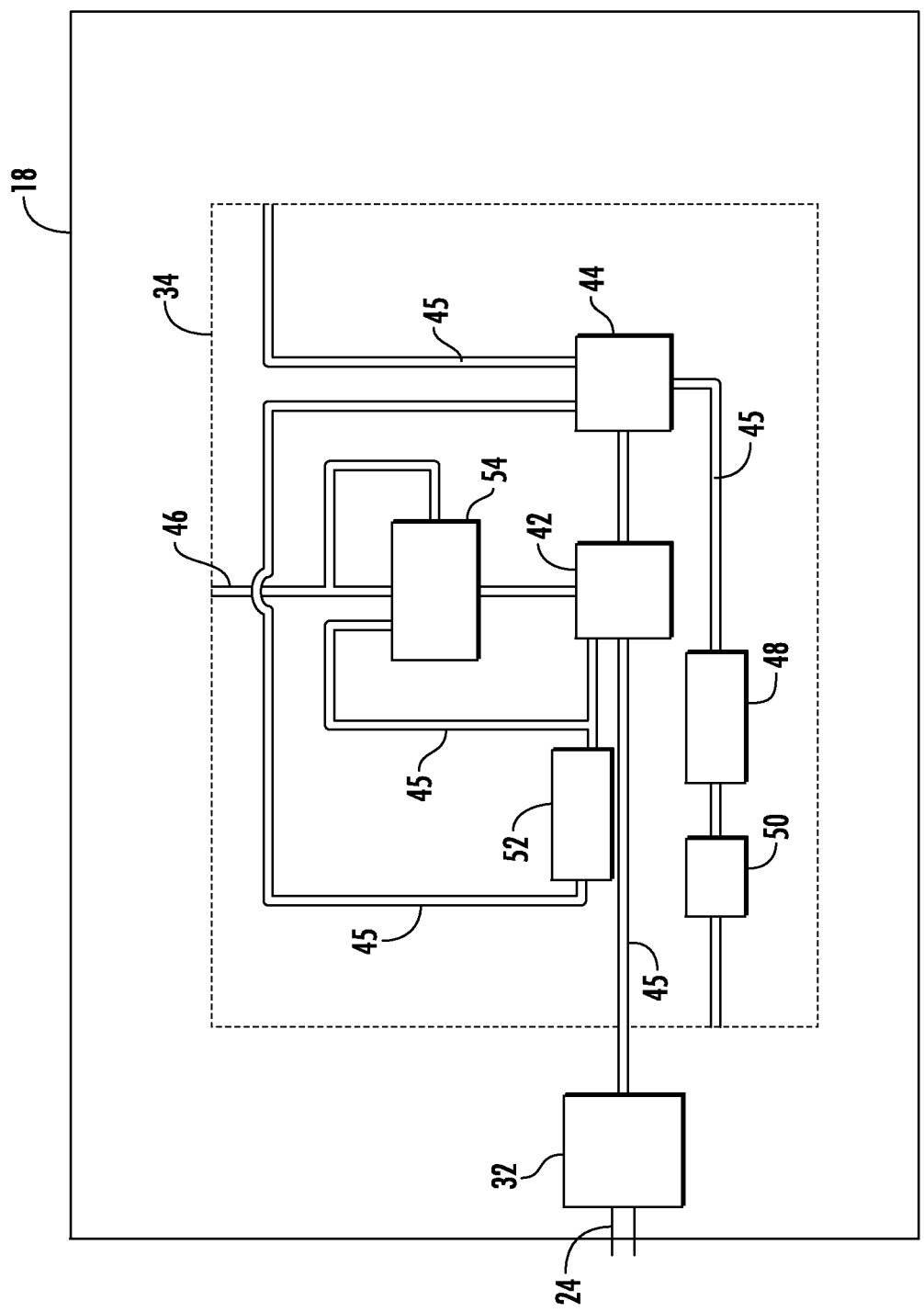
FIG. 4 is a schematic view of a control manifold constructed in accordance with the present disclosure.

The present disclosure and FIGS. 1-3 relate to a pressure control system 10 that monitors a desired pressure of a pressurized system 12 and can automatically open or close a flow control device 14 depending upon the need to reduce pressure or to stop flow to the pressurized system 12. The pressurized system 12 can be any type of facility that processes fluids, such as a natural gas processing plant, flare systems, power plants, petrochemical plants, and the like. The flow control device 14 can be disposed in a fluid transportation conduit 15 that can be provided to place the pressurized system 12 and a fluid supply 16 in fluid communication with one another. The fluid supply 16 can be any apparatus known in the art for providing fluid, such as a pipeline. The fluid can be a liquid, gas, steam, or a combination thereof. It should be understood that the fluid transportation conduit 15 can be a single pipe (or conduit) or it can be a network of piping (or conduits) used within the pressurized system 12, or used to maintain the pressurized system 12 and the fluid supply 16 in fluid communication.

In addition to the flow control device 14, the pressure control system 10 can include a control module 18 for determining when the fluid flow from the fluid supply 16 to the pressurized system 12 should be altered, and an actuator 20 to cause the flow control device 14 to open or close the flow control device 14. The flow control device 14 can be any type of valve and/or flow control device known in the art. In one embodiment, the flow control device 14 can be any type of sliding stem valve or quarter-turn type of valve.

The pressure control system 10 can also include an actuator charge line 22 for providing a pneumatic signal from the control module 18 to the actuator 20 to open or close the flow control device 14 and a pressure sensing line 24 to provide a pneumatic signal to the control module 18 responsive to the pressure of the fluid in the fluid transportation conduit 15. The pressure sensing line 24 can have a first end 26 connected to the fluid transportation conduit 15 and a second end 28 connected to the control module 18. The first end 26 can be connected to the fluid transportation conduit 15 in any manner known in the art such that the pressure of the fluid in the conduit 15 can be relayed to the control module 18. It should be understood and appreciated that the pressure control system 10 can operate without the use of any electronic power.

In one embodiment, an operational pressure of the pressurized system 12, or an operational pressure of a predetermined point within the pressurized system 12 is determined. Furthermore, a predetermined pressure for a predetermined pressure point 30 is selected that correlates to the operational pressure of the pressurized system 12 and/or the operational pressure of a predetermined point within the pressurized system 12. The control module 18 can monitor the pressure at the predetermined pressure point 30 and facilitate the opening and closing of the flow control device 14 so as to maintain the operational pressure of the pressurized system 12 and/or the operational pressure of a predetermined point within the pressurized system 12.

In one embodiment, shown in FIG. 1, the predetermined pressure point 30 is selected to be in the fluid transportation conduit 15 upstream of the flow control device 14. In another embodiment, shown in FIG. 2, the predetermined pressure point 30 is selected to be in the fluid transportation conduit 15 downstream of the flow control device 14. In another embodiment, shown in FIG. 3, the predetermined pressure point 30 is selected to be located somewhere in the pressurized system 12. It should be understood and appreciated that the predetermined pressure point 30 can be selected to be in any location of the pressurized system 12 or the pressure control system 10 such that the operational pressure of the pressurized system 12 and/or the operational pressure of a predetermined point within the pressurized system 12 is kept within a predetermined range.

The control module 18 includes a pressure sensor 32 connected to the pressure sensing line 24 for determining the pressure of the fluid at the predetermined pressure point 30 and a control manifold 34 in fluid communication with the pressure sensor 32 for processing pneumatic and pressure information received from the pressure sensor 32 and using this information to operate the flow control device 14, via the actuator charge line 22 and the actuator 20. The control module 18 can also include a manifold exhaust 36 for venting fluid from the control module 18, a pressure relief vent 38 for allowing fluid to be expelled from the control module 18 when certain conditions are met, and an instrument air pressure line 40 can be included to charge the pressure control system 10 if the pressure sensing line 24 does not have adequate pressure to do so. The instrument air pressure line 40 can be connected to an instrument air system (not shown) as part of the pressurized system 12 or it can be a pressurized container (not shown). The fluid used in the instrument air system or pressurized container can be air, hydraulic fluid or other incompressible or compressible fluids or other media if necessary to charge the pressure control system 10.

The pressure sensor 32 can be any device capable of determining the pressure of fluid without the use of an electrical supply. In one embodiment, the pressure sensor 32 can be equipped to determine an upper and a lower pressure. When the pressure sensing line 24 delivers fluid to the pressure sensor 32 that reaches the upper pressure limit, the pressure sensor 32 provides a pneumatic signal to the control manifold 34 that the flow control device 14 needs to be either opened or closed depending upon the desired pressure for the pressurized system 12. Similarly, when the pressure sensing line 24 delivers fluid to the pressure sensor 32 that reaches the lower pressure limit, the pressure sensor 32 provides a pneumatic signal to the control manifold 34 that the flow control device 14 needs to be either opened or closed depending upon the desired pressure for the pressurized system 12. In one embodiment, the pressure sensor 32 can be a pressure sensing valve such as a ports and spool mechanism that can be adjusted to detect predetermined upper and lower pressure limits and determine when fluid passing to it is above, below or within the range of the upper and lower pressure limits.

In one embodiment, the control manifold 34 of the control module 18 can include an air switch 42 to receive the pneumatic signal from the pressure sensor 32, a charge valve 44 to receive the fluid and pneumatic signal from the air switch 42 to either pass the fluid to a manifold exhaust port 46 if the fluid being taken via the pressure sensing line 24 is determined to be within acceptable limits, or pass the fluid to actuator charge line 22 to signal the actuator 20 to open or close the flow control device 14, depending on the pressure of the fluid delivered to the pressure sensor 32, via the pressure sensing line 24. The control manifold 34 can also include a plurality of conduits 45 for transporting the fluid, which can be under pressure, between various components of the control manifold 34.

In another embodiment of the present disclosure, the control manifold 34 can include a first regulator 48 for controlling the pressure of the fluid from the instrument air pressure line 40 to the charge valve 44 and a discharge prevention device 50 (such as a valve) to prevent the pressure control system 10 from discharging the fluid and keep the charge valve 44 active. In one embodiment, the first regulator 48 maintains the pressure of the fluid entering from the instrument air pressure line 40 in a range of from about 80 psi to about 120 psi.

In another embodiment, when the pressure control system 10 is used to control the pressurized system 12 at high pressures (e.g., above 1000 psi) or low pressures (e.g., less than 25 psi), the control manifold 34 will also include a second regulator 52 for adjusting the pressure of the fluid provided to the air switch 42. The air switch 42 can be ineffective at low pressures, and high pressures can destroy or compromise the air switch 42. Thus, when the pressurized system 12 requires a relatively low pressure to be maintained (or set as a low limit), the second regulator 52 can add a predetermined pressure to the low pressure fluid coming from the pressure sensing line 24 to make operation of the air switch 42 more effective. For example, the low pressure to be monitored by the pressure control system 10 can be 1 psi, and the flow control device 14 only functions when the pressure of the fluid entering via the pressure sensing line 24 is less than 1 psi. The air switch 42 can be ineffective at this pressure. In this example, the pressure of the fluid entering via the pressure sensing line 24 is 0.5 psi and the second regulator 52 can be configured to add 25 psi to the pressure of the fluid entering via the pressure sensing line 24 to generate a fluid having a pressure of 25.5 psi to send to the air switch 42, which can operate more effectively at pressures above 25 psi. The air switch 42, in this exemplary embodiment, would be configured to operate the flow control device 14 when the pressure of the fluid from the second regulator 52 is 26 psi (instead of 1 psi).

In another embodiment, the pressure control system 10 can be used to control the flow control device 14 at high pressures required for operation of the pressurized system 12. These high pressures can damage components in the control manifold 34, such as the air switch 42. In these situations, the second regulator 52 can be configured such that they bleed off a specific amount of pressure (e.g., 1000 psi) so that the pressure of the fluid that leaves the second regulator 52 and passes to the air switch 42 is in a range that would not damage the air switch 42. In another embodiment, the control manifold 34 can include a circuit enable 54 to stabilize the air switch 42 and optimize the performance of the air switch 42.

Figure 5:
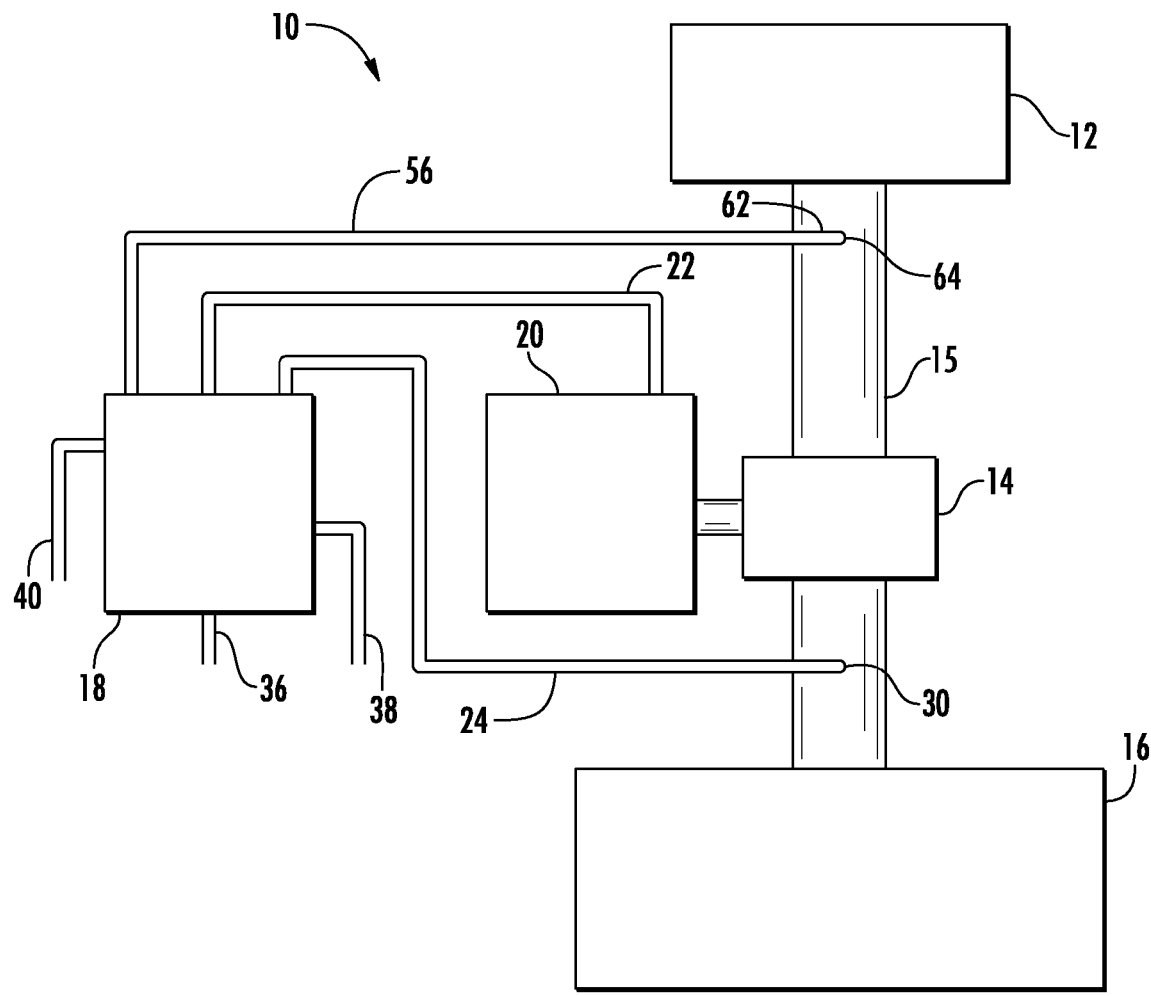
FIG. 5 is a schematic view of another embodiment of the pressure control system constructed in accordance with the present disclosure.
Figure 6:
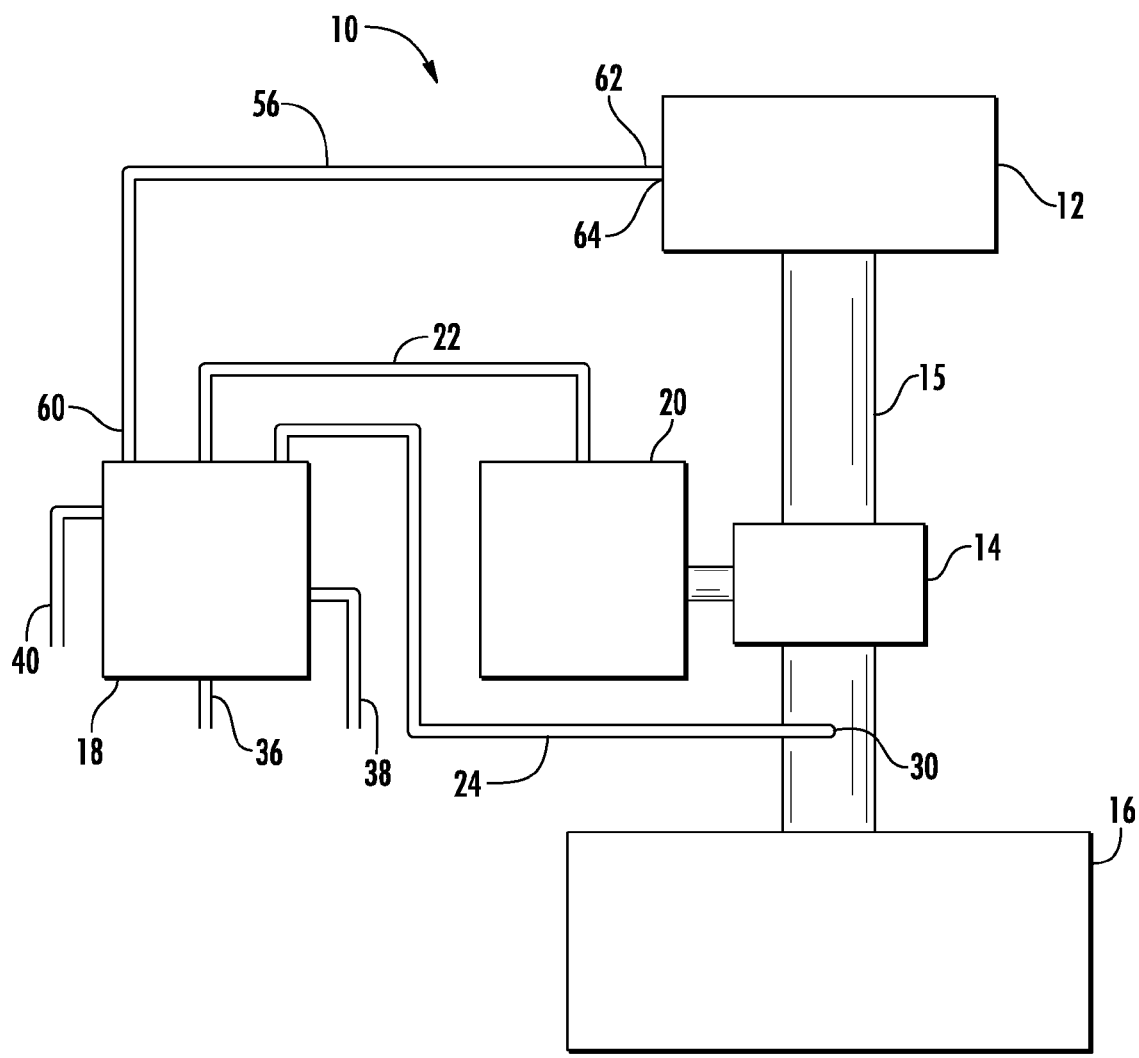
FIG. 6 is a schematic view of another embodiment of the pressure control system constructed in accordance with the present disclosure.

In a further embodiment of the present disclosure, and shown in FIGS. 5 and 6, the pressure control system 10 can include a second pressure sensing line 56 attached to the control module 18 and connected to a second predetermined pressure point 64. The first and second predetermined pressure points 30 and 64 can be used when a differential in pressure is monitored to determine when the flow control device 14 should be opened or closed. The second pressure sensing line 56 has a first end 60 connected to the control module 18 and a second end 62 that can be attached to a second predetermined pressure point 64 in the system to monitor a pressure. In one embodiment, the second predetermined pressure point 64 can be in the fluid transportation conduit 15 downstream of the flow control device 14 as shown in FIG. 5. In another embodiment, the second predetermined pressure point 64 can be at some predetermined point in the pressurized system 12, as shown in FIG. 6.

Figure 7:
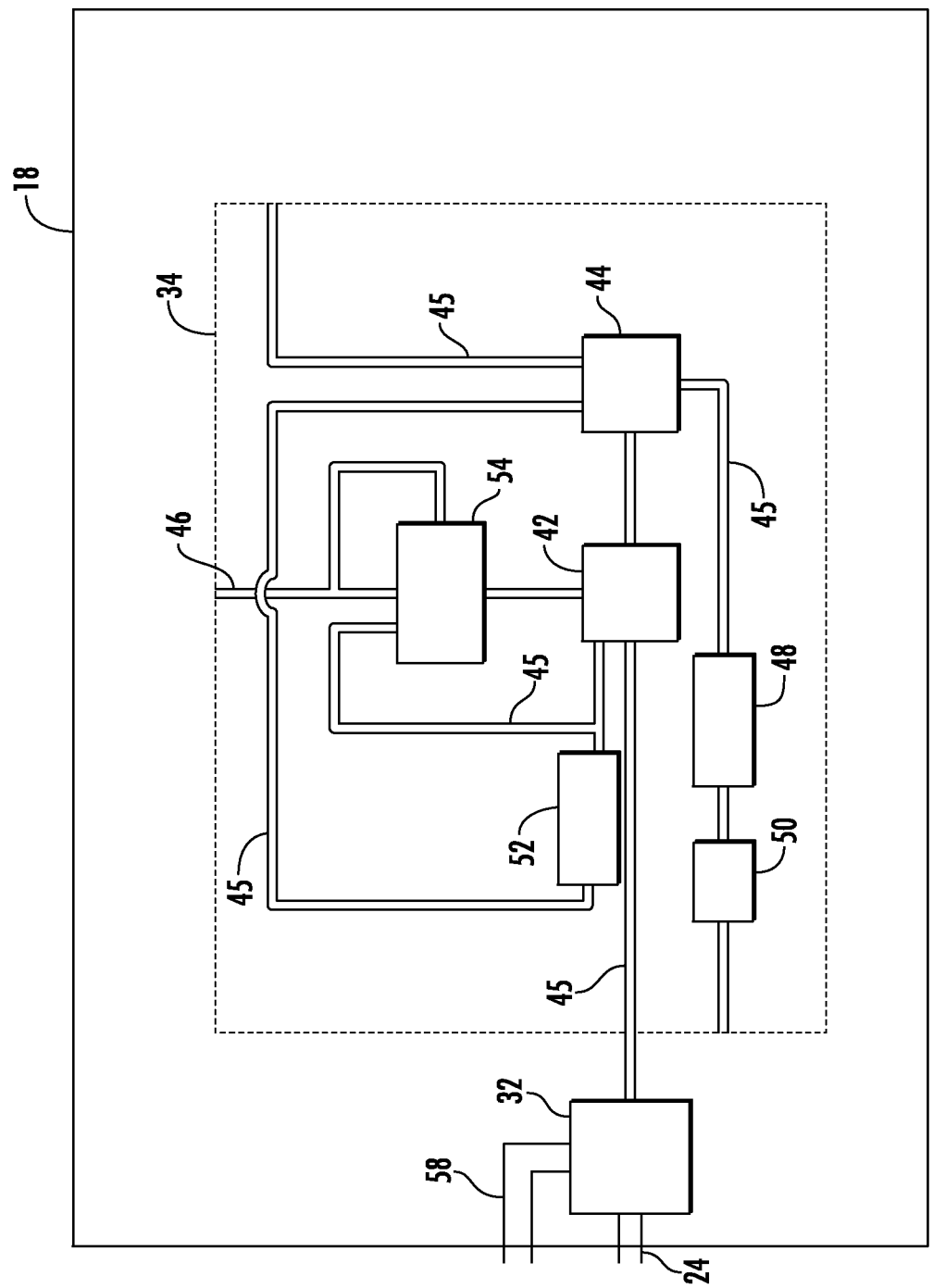
FIG. 7 is a schematic view of another embodiment of the control manifold constructed in accordance with the present disclosure.

As shown in FIG. 7, when a differential in pressure is monitored to determine when the flow control device 14 is opened or closed, the second predetermined pressure sensing line 58 is fed to the pressure sensor 32 of the control module 18 along with the pressure sensing line 24.

The control module 18 can also include devices for manually actuating the flow control device 14 and charging the charge valve 44. In another embodiment, the pressure control system 10 can be set up wherein the charge valve 44 can be charged from a remote location.

From the above description, it is clear that the present invention is well adapted to carry out the objectives and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A pressure control system for monitoring fluid pressure for a pressurized system, the pressure control system comprising:
    a fluid control device for affecting the pressure of fluid downstream from the fluid control device;
    an actuator for opening and closing the fluid control device; and
    a control module for processing pneumatic signals from at least one predetermined pressure point upstream or downstream from the fluid control device, the control module sending signals to the actuator to open or close the fluid control device responsive to pneumatic signals, the control module comprising:
        a pressure sensor to determine pressures of the fluid from the at least one predetermined pressure point;
        an air switch to receive pneumatic signals from the pressure sensor responsive to the pressure of the fluid from the at least one predetermined pressure point;
        a charge valve to send a pneumatic signal to the actuator or exhaust fluid from the control module responsive to a pneumatic signal received from the air switch;
        a first regulator to control the pressure of fluid entering the control module from an instrument air pressure line and passing to the charge valve; and
        a second regulator to alter pressure of fluid from the pressure sensor to increase the air switches effectiveness at system pressures outside of an operational range of the air switch.

2. The pressure control system of claim 1 further comprising a fluid supply which provides a fluid source for the pressurized system, the fluid supply in fluid communication with the pressurized system via a fluid transportation conduit.

3. The pressure control system of claim 1 wherein the predetermined pressure point can be located upstream or downstream of the fluid control device.

4. The pressure control system of claim 1 wherein the predetermined pressure point can be located within the pressurized system.

5. The pressure control system of claim 1 wherein fluid is taken from the predetermined pressure point to the control module via a first pressure sensing line.

6. The pressure control system of claim 1 wherein the second regulator adds a predetermined amount of pressure to a low pressure fluid from the predetermined pressure point to enhance the air switches effectiveness.

7. The pressure control system of claim 1 wherein the second regulator reduces a high pressure fluid received via the predetermined pressure point a predetermined amount to a lower pressure to enable the air switch to handle the fluid without destroying the air switch.

8. The pressure control system of claim 1 wherein the control module further comprises a circuit enable to stabilize and optimize performance of the air switch.

9. The pressure control system of claim 1 wherein the control module opens or closes the fluid control device via the actuator when the pressure of the fluid from the predetermined pressure point is above or below a predetermined pressure range.

10. The pressure control system of claim 1 wherein the control module opens or closes the fluid control device via the actuator when the pressure of the fluid from the predetermined pressure point is above or below a predetermined pressure.

11. The pressure control system of claim 5 further comprising a second pressure sensing line providing a fluid under pressure from a second predetermined pressure point to the control module, the control module opening and closing the fluid control device responsive to a differential in pressure between the pressure of the fluid from the predetermined pressure point and the fluid from the second predetermined pressure point.

12. The pressure control system of claim 11 wherein the first predetermined pressure point is positioned upstream from the fluid control device and the second predetermined pressure point is positioned downstream of the fluid control device.

13. The pressure control system of claim 11 wherein the first predetermined pressure point is positioned upstream from the fluid control device and the second predetermined pressure point is positioned at a location within the pressurized system.

14. The pressure control system of claim 11 wherein the fluid from the second predetermined pressure point is fed to the pressure sensor of the control module in addition to the first predetermined pressure point.

15. The pressure control system of claim 14 wherein the pressure sensor provides a pneumatic signal to the air switch responsive to the differential in pressure between the fluid from the pressure of the fluid from the first predetermined pressure point and the fluid from the second predetermined pressure point.

16. A pressure control system for monitoring fluid pressure for a pressurized system, the pressure control system comprising:
    a fluid control device for affecting the pressure of fluid downstream from the fluid control device;
    an actuator for opening and closing the fluid control device; and
    a control module for processing pneumatic signals from at least one predetermined pressure point upstream or downstream from the fluid control device, the control module sending signals to the actuator to open or close the fluid control device responsive to pneumatic signals, fluid is taken from the predetermined pressure point to the control module via a first pressure sensing line, the control module comprising:
- a pressure sensor to determine pressures of the fluid from the at least one predetermined pressure point;
- an air switch to receive pneumatic signals from the pressure sensor responsive to the pressure of the fluid from the at least one predetermined pressure point; and
- a charge valve to send a pneumatic signal to the actuator or exhaust fluid from the control module responsive to a pneumatic signal received from the air switch; and
- a second pressure sensing line providing a fluid under pressure from a second predetermined pressure point to the control module, the control module opening and closing the fluid control device responsive to a differential in pressure between the pressure of the fluid from the predetermined pressure point and the fluid from the second predetermined pressure point.

17. The pressure control system of claim 16 wherein the first predetermined pressure point is positioned upstream from the fluid control device and the second predetermined pressure point is positioned downstream of the fluid control device.

18. The pressure control system of claim 16 wherein the first predetermined pressure point is positioned upstream from the fluid control device and the second predetermined pressure point is positioned at a location within the pressurized system.

19. The pressure control system of claim 16 wherein the fluid from the second predetermined pressure point is fed to the pressure sensor of the control module in addition to the first predetermined pressure point.

20. The pressure control system of claim 19 wherein the pressure sensor provides a pneumatic signal to the air switch responsive to the differential in pressure between the fluid from the pressure of the fluid from the first predetermined pressure point and the fluid from the second predetermined pressure point.

\* \* \* \* \*